United States Patent
Pan et al.

(10) Patent No.: US 9,614,457 B2
(45) Date of Patent: Apr. 4, 2017

(54) MODULAR THYRISTOR-BASED RECTIFIER CIRCUITS

(71) Applicant: ABB Technology AG, Zurich (CH)

(72) Inventors: Zhiguo Pan, Cary, NC (US); Sandeep Bala, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 319 days.

(21) Appl. No.: 14/057,760

(22) Filed: Oct. 18, 2013

(65) Prior Publication Data

US 2015/0109837 A1    Apr. 23, 2015

(51) Int. Cl.
    *H02M 7/06* (2006.01)
    *H02M 7/162* (2006.01)
    *H02M 7/25* (2006.01)

(52) U.S. Cl.
    CPC ............ *H02M 7/06* (2013.01); *H02M 7/162* (2013.01); *H02M 7/25* (2013.01)

(58) Field of Classification Search
    CPC ..... H01F 30/12; H02M 3/33576; H02M 7/10; H02M 7/19; H02M 7/2176;
    (Continued)

(56) References Cited

U.S. PATENT DOCUMENTS 3,764,815 A    10/1973    Habock et al.
3,909,697 A *   9/1975    Depenbrock .................. 363/126
(Continued)

FOREIGN PATENT DOCUMENTS

CN    201966683 U    9/2011
CN    202172281 U    3/2012
(Continued)

OTHER PUBLICATIONS

Zargari, Navid R. et al., "A Multilevel Thyristor Rectifier with Improved Power Factor", IEEE Transactions on Industry Applications, vol. 33, No. 5, Sep./Oct. 1997, 1208-1213.
(Continued)

*Primary Examiner* — Adolf Berhane
*Assistant Examiner* — Henry Lee, III
(74) *Attorney, Agent, or Firm* — Taft Stettinius & Hollister LLP (57) ABSTRACT

Power conversion apparatus for controllably converting alternating current (AC) to direct current (DC). An example apparatus includes multiple AC sources, galvanically isolated from one another, and multiple bridge rectifier circuits, including one or more controllable bridge rectifier circuits, where each bridge rectifier circuit has respective AC-side terminals and DC-side terminals and each bridge rectifier circuit is connected to a corresponding one of the AC sources via its AC-side terminals. The DC-side terminals are connected so that the outputs of the bridge rectifier circuits are combined in series. A control circuit is configured to individually control each controllable bridge rectifier circuit to selectively operate in a regulator mode, whereby a non-zero voltage less than or equal to the maximum rectifier voltage is provided, and a bypass mode, whereby the controllable bridge rectifier circuit provides a negligible voltage to its DC-side terminals and draws negligible current from its corresponding AC source.

13 Claims, 6 Drawing Sheets

(58) Field of Classification Search
CPC ......... H02M 2001/007; H02M 3/3376; H02M 5/458; H02M 7/066; H02M 7/162; H02M 7/49
USPC .......................... 363/64–65, 67–68, 123–129
See application file for complete search history.

(56) References Cited

U.S. PATENT DOCUMENTS

| | | | |
|---|---|---|---|
| 4,335,424 A * | 6/1982 | Zabar | H02M 7/19 363/54 |
| 5,170,334 A | 12/1992 | Ito et al. | |
| 5,446,643 A * | 8/1995 | McMurray | 363/40 |
| 5,715,151 A | 2/1998 | Moriura | |
| 6,434,020 B1 | 8/2002 | Lambert et al. | |
| 6,487,096 B1 | 11/2002 | Gilbreth et al. | |
| 6,958,550 B2 | 10/2005 | Gilbreth et al. | |
| 7,218,012 B1 | 5/2007 | Edenfeld | |
| 7,397,143 B2 | 7/2008 | Walling | |
| 7,449,794 B2 | 11/2008 | Guey et al. | |
| 7,602,074 B2 | 10/2009 | Voss | |
| 7,952,232 B2 | 5/2011 | Burra et al. | |
| 8,018,083 B2 | 9/2011 | Larsen et al. | |
| 8,138,620 B2 | 3/2012 | Wagoner et al. | |
| 8,174,138 B2 | 5/2012 | Castelli Dezza et al. | |
| 8,188,610 B2 | 5/2012 | Scholte-Wassink | |
| 8,330,296 B2 | 12/2012 | Ottman | |
| 8,436,490 B2 | 5/2013 | Gertmar | |
| 2002/0079706 A1 | 6/2002 | Rebsdorf et al. | |
| 2004/0026929 A1 | 2/2004 | Rebsdorf et al. | |
| 2004/0080164 A1 | 4/2004 | McKelvey et al. | |
| 2006/0192390 A1 | 8/2006 | Juanarena Saragueta et al. | |
| 2007/0132248 A1 | 6/2007 | Weng et al. | |
| 2007/0228836 A1 | 10/2007 | Teichmann | |
| 2008/0001408 A1 | 1/2008 | Liu et al. | |
| 2008/0129120 A1 | 6/2008 | Su et al. | |
| 2008/0252267 A1 | 10/2008 | Lando et al. | |
| 2008/0303489 A1 | 12/2008 | Park et al. | |
| 2009/0230689 A1 | 9/2009 | Burra et al. | |
| 2009/0322083 A1 * | 12/2009 | Wagoner | H02J 3/38 290/44 |
| 2010/0045040 A1 | 2/2010 | Bendixen et al. | |
| 2010/0060000 A1 | 3/2010 | Scholte-Wassink et al. | |
| 2010/0124087 A1 | 5/2010 | Falk et al. | |
| 2010/0270864 A1 | 10/2010 | Vyas et al. | |
| 2011/0013441 A1 | 1/2011 | Gruber et al. | |
| 2011/0042965 A1 | 2/2011 | Atallah et al. | |
| 2011/0049994 A1 | 3/2011 | Hiller et al. | |
| 2011/0057443 A1 | 3/2011 | Rivas et al. | |
| 2011/0057631 A1 | 3/2011 | Dalessandro et al. | |
| 2011/0140534 A1 | 6/2011 | Yasugi | |
| 2011/0175355 A1 | 7/2011 | Rosenvard | |
| 2011/0291479 A1 | 12/2011 | Lee | |
| 2012/0139246 A1 | 6/2012 | Rafoth et al. | |
| 2012/0280665 A1 | 11/2012 | Su et al. | |
| 2012/0286512 A1 | 11/2012 | Biellmann et al. | |
| 2013/0016537 A1 | 1/2013 | Deng | |
| 2013/0027994 A1 | 1/2013 | Nelson et al. | |
| 2013/0082628 A1 | 4/2013 | Takegami et al. | |
| 2013/0113212 A1 | 5/2013 | Sakamoto et al. | |
| 2013/0154264 A1 | 6/2013 | Hatanaka et al. | |
| 2013/0181688 A1 | 7/2013 | Tupper et al. | |
| 2013/0184884 A1 | 7/2013 | More et al. | |
| 2013/0193766 A1 | 8/2013 | Irwin et al. | |
| 2013/0200617 A1 | 8/2013 | Smith et al. | |
| 2013/0200620 A1 | 8/2013 | Gupta et al. | |
| 2013/0208522 A1 | 8/2013 | Monjean et al. | |
| 2013/0264882 A1 | 10/2013 | Abasolo et al. | |
| 2013/0285491 A1 | 10/2013 | Kuznetsov et al. | |
| 2013/0343111 A1 | 12/2013 | Nelson et al. | |
| 2014/0152109 A1 | 6/2014 | Kanakasabai et al. | |
| 2014/0225369 A1 | 8/2014 | Bodewes et al. | |
| 2015/0001848 A1 | 1/2015 | Imaie et al. | |

FOREIGN PATENT DOCUMENTS

| | | |
|---|---|---|
| EP | 2114001 A1 | 4/2009 |
| EP | 2166225 A1 | 3/2010 |
| EP | 2283233 B1 | 5/2011 |
| EP | 2565443 A1 | 3/2013 |
| JP | 6249828 A | 3/1987 |
| WO | 0125628 A2 | 4/2001 |
| WO | 2009110648 A1 | 9/2009 |
| WO | 2011058170 A1 | 5/2011 |
| WO | 2011124258 A1 | 10/2011 |
| WO | 2012026026 A1 | 3/2012 |
| WO | 2012103894 A2 | 8/2012 |

OTHER PUBLICATIONS

Chen, Z., et al., "A Review of the State of the Art of Power Electronics for Wind Turbines," IEEE Transactions on Power Electronics, Aug. 2009, pp. 1859-1875, vol. 24, No. 8, IEEE Power Electronics Society.

Fletcher, J., et al., "Introduction to Doubly-Fed Induction Generator for Wind Power Applications," Paths to Sustainable Energy, Dec. 30, 2010, pp. 259-278, InTech.

Keshavarz, S. "Design and Evaluation of an Active Rectifier for a 4.1 MW Off-Shore Wind Turbine," Master of Science Thesis, Chalmers University of Technology, 2011, pp. a-42, Göteborg, Sweden.

Pekarek, S., et al., "ACSL/Graphic Modeller component models for electric power education," IEEE Transactions on Education, Nov. 1998, Subsection D. "Six-pulse bride rectifier," vol. 41, No. 4, IEEE Education Society.

Xiang, D. et al., "Coordinated Control of an HVDC Link and Doubly Fed Induction Generators in a Large Offshore Wind Farm", IEEE Transactions on Power Delivery, vol. 21, No. 1, Jan. 2006, pp. 463-471.

* cited by examiner

PRIOR ART

*FIG. 1*

PRIOR ART

MODULAR THYRISTOR-BASED RECTIFIER CIRCUITS

TECHNICAL FIELD

The present disclosure relates to modular thyristor-based rectifier circuits.

BACKGROUND

Bridge rectifier circuits are commonly used to convert alternating-current (AC) voltages to direct-current (DC) voltages, and may be designed to convert poly-phase AC voltages, such as the three-phase AC voltages commonly produced in power generation systems, into a single DC voltage, with low losses.

The simplest bridge rectifier circuits utilize diodes as the switching elements. However, these circuits are not controllable, in that the circuits do not allow regulation of their DC output voltages. Controllable bridge rectifier circuits thus use controllable devices, such as thyristors, insulated-gate bipolar transistors (IGBTs), or integrated gate-commutated thyristors (IGCTs). One common configuration for a controllable bridge rectifier circuit is shown in FIG. 1, which illustrates a six-pulse, controlled, bridge rectifier circuit connected to a three-phase AC source having commutating inductances in each phase.

Figure 1:
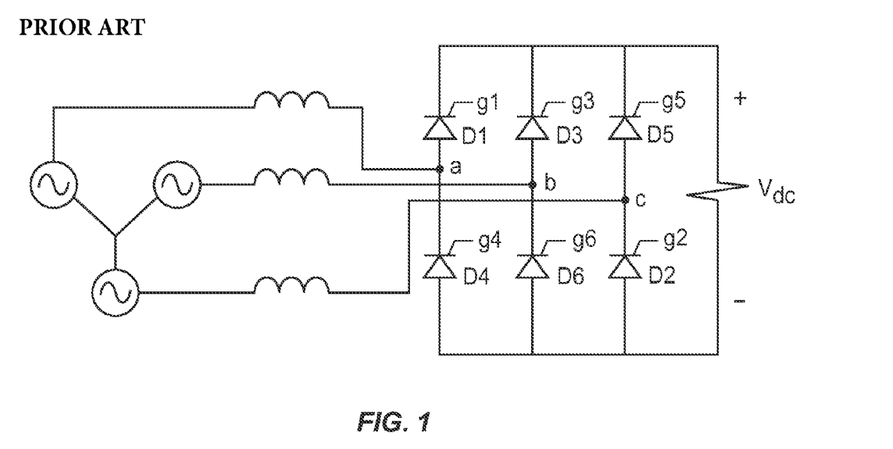
FIG. 1 is a schematic diagram illustrating a three-phase, six-pulse, thyristor bridge rectifier circuit.

In the controllable bridge rectifier circuit of FIG. 1, thyristors D1-D6 are arranged in three pairs, where each pair is connected in series. The midpoint between each pair is connected to one of the phases of the AC sources. In the discussion that follows, a pair of devices arranged in this manner is referred to as a "phase leg," while the upper and lower halves of each phase leg is referred to as an "arm." Thus, thyristors D1 and D4 together form a phase leg in the circuit of FIG. 1, while each of the thyristors individually corresponds to an arm of that leg. A second phase leg comprises thyristors D3 and D6, while a third phase leg includes thyristors D2 and D5. Corresponding endpoints of each phase leg are connected together, and the DC output $V_{dc}$ is taken from across these endpoints, as seen in FIG. 1.

The operation of a controllable bridge rectifier circuit like the one shown in FIG. 1 is well known. For an ideal circuit (i.e., ignoring the commutating inductances shown in FIG. 1), the no-load average output voltage is $$V_{dc} = V_{ac} = \frac{3\sqrt{3}\, V_{peak}}{\pi} \cos\alpha,$$

where $V_{peak}$ is the peak value of the phase (line-to-neutral) input voltages and a is the firing angle of the thyristors, i.e., the phase angle, relative to the zero-crossing point of the AC waveform in a given thyristor's phase leg, at which the thyristor is triggered into conduction. If the commutating inductances are considered and assumed to have an inductance of $L_d$, then the output voltage is a function of the DC load current $I_d$, and is given by $$V_{dc} = V_{ac} = \frac{3\sqrt{3}\, V_{peak}}{\pi} \cos\alpha - 6fL_d I_d,$$

where f is the AC frequency.

Figure 2:
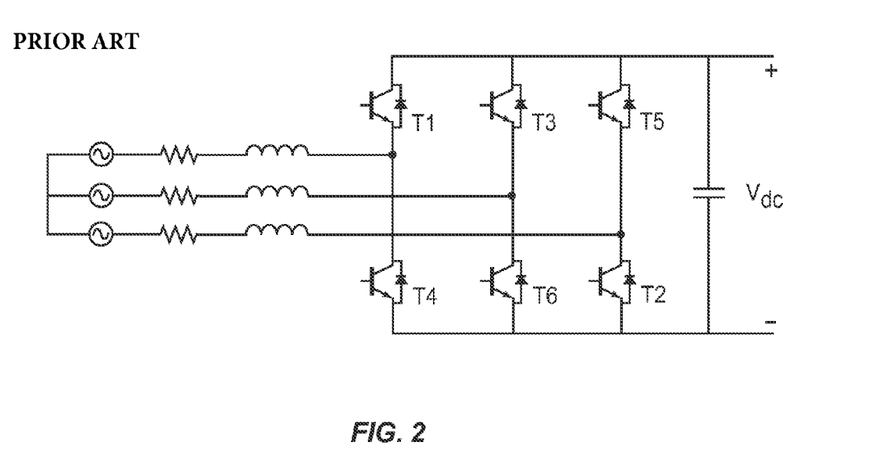
FIG. 2 is a schematic diagram illustrating a three-phase, six-pulse, bridge rectifier circuit using IGBTs.

Insulated-gate bipolar transistors (IGBTs) are also commonly used in controllable bridge rectifier circuits, especially in applications having higher switching frequencies (e.g., above 1 kHz). FIG. 2 illustrates an example of such a circuit, in which IGBTs T1-T6 replace the thyristors D1-D6 of FIG. 1. The circuit of FIG. 2 is otherwise the same as that pictured in FIG. 1, except that the circuit of FIG. 2 includes AC source resistances as well as the commutating inductances.

Electric power distribution systems are increasingly incorporating high-voltage, direct-current (HVDC) transmission links. HVDC systems offer several advantages over conventional AC transmission—they can be less expensive and have lower losses for long transmissions, and they allow power transmission between unsynchronized AC systems.

In many applications, then, a low-cost, high-power rectifier system is needed to feed a HVDC bus or grid. These rectifier systems must be controllable, because the source voltage varies in amplitude (and may also vary in frequency) in some of these applications. For example, a typical wind or tidal generator output voltage ranges from 40-100% of the nominal output for the generator. A typical marine generator output voltage ranges from 70-100% of the nominal value. In these applications, typical nominal generator voltages may range from 690 VAC to 13.8 kVAC, while typical DC bus voltages may range from 10 kVDC to 120 kVDC. Low-cost solutions that provide a large degree of controllability in conjunction with high performance over a wide range of operating conditions are needed.

SUMMARY

Embodiments of the present invention include power conversion apparatus for controllably converting alternating current (AC) to direct current (DC). An example power conversion apparatus includes multiple AC sources galvanically isolated from one another, and multiple bridge rectifier circuits, including one or more controllable bridge rectifier circuits, where each bridge rectifier has respective AC-side terminals and DC-side terminals and each bridge rectifier circuit is connected to a corresponding one of the AC sources via its AC-side terminals. The DC-side terminals are connected so that the outputs of the bridge rectifier circuits are combined in series. The power conversion apparatus further includes a control circuit configured to individually control each controllable bridge rectifier circuit to selectively operate in a regulator mode, whereby a non-zero voltage less than or equal to the maximum rectifier voltage is provided by the controllable bridge rectifier circuit, and a bypass mode, whereby the controllable bridge rectifier circuit provides a negligible voltage to its DC-side terminals and draws negligible current from its corresponding AC source.

In some cases, the power conversion apparatus may include a transformer having a primary winding configured for connection to an AC source and at least one output winding. In these embodiments, at least one of the bridge rectifier circuits has its AC-side terminals connected across one of the output windings. In some of these embodiments, one of the bridge rectifier circuits has its AC-side terminals connected to the primary winding.

In some embodiments of the power conversion apparatus, at least one of the bridge rectifier circuits is a diode rectifier circuit. In some of these and in some other embodiments, the multiple bridge rectifier circuits include at least two controllable bridge rectifier circuits, where the regulator mode for each of the at least two controllable bridge rectifier circuits comprises a voltage regulating mode and a full output mode, and where the control circuit is configured to control the at least two controllable bridge rectifier circuits so that only one of the controllable bridge rectifier circuits is operating in voltage regulating mode at any given time, while each of the remaining controllable bridge rectifier circuits is operating in either bypass mode or full output mode. In some of these embodiments, the control circuit is configured to control the at least two controllable bridge rectifier circuits so as to successively operate a different one of the at least two controllable bridge rectifier circuits in voltage regulating mode, while each of the remaining controllable bridge rectifier circuits is operating in either bypass mode or full output mode.

In any of the embodiments described above, one or more of the controllable bridge rectifier circuits may be a thyristor bridge rectifier, where the control circuit is configured to control the thyristor bridge rectifier to operate in bypass mode by triggering thyristors in both arms of a single phase leg to conduct simultaneously. In some embodiments, it may be beneficial to rotate the bypass mode from one phase leg to another, so as to balance the thermal load (caused by the DC current flowing through the bypass leg) among the phase legs. Thus, the control circuit in these embodiments is configured to control the thyristor bridge rectifier(s) in bypass mode by successively triggering thyristors so as to rotate a bypass leg among multiple phase legs of the thyristor bridge rectifier.

Embodiments of the present invention extend not only to power-conversion apparatus, but also to corresponding methods for providing and operating such apparatus. Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

Figure 3:
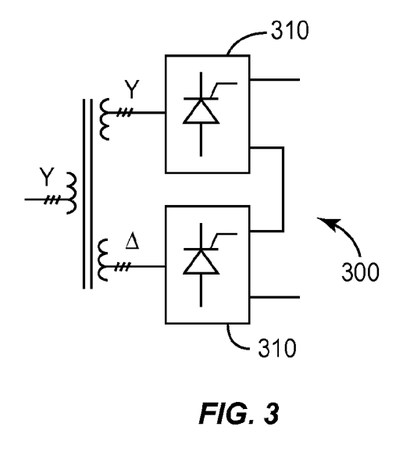
FIGS. 3, 4, and 5 illustrate transformer-based power conversion circuits utilizing one or more controllable bridge rectifier circuits.

As discussed above, low-cost, high-performance, high-power rectifier systems are needed. Conventional 6-pulse and other multi-pulse thyristor bridges can be used to provide low-cost, high-power solutions. One example configuration is shown in FIG. 3, where the AC-side terminals of each of two thyristor bridge rectifier circuits 310 are connected to respective secondary windings of a transformer, while their DC-side terminals are connected so that the DC outputs of the rectifier circuits 310 are combined in series. A phase shift between the secondary windings allows for a reduction in harmonics in the input current, and also reduces ripple in the output voltage. While each of the bridge rectifier circuits 310 may have a 6-pulse configuration like the configuration shown in FIG. 1, other configurations, such as a 12-pulse configuration, may be used instead. Note that multi-phase (e.g., 3-phase) windings are assumed. Thus, each bridge rectifier circuit 310 in FIG. 3 has multiple connections to a set of multi-phase windings; for the 3-phase case, this connection may be either in a "wye" (or "star") configuration or a "delta" configuration. It should be noted that this assumption applies to FIGS. 4, 5, 7, 8, 9A, and 9B, as well; thus, every AC-side connection to a bridge rectifier circuit in these figures should be understood to be a multi-phase connection.

The approach shown in FIG. 3 allows a great deal of control over the output voltage, while also allowing the power-handling requirements to be distributed across two (or more) rectifier circuits. However, the circuit operates with low power factors at rated voltage, especially when both rectifier circuits are regulating their respective output voltages to levels well below their maximum possible levels, leading to poor overall system performance.

Figure 4:
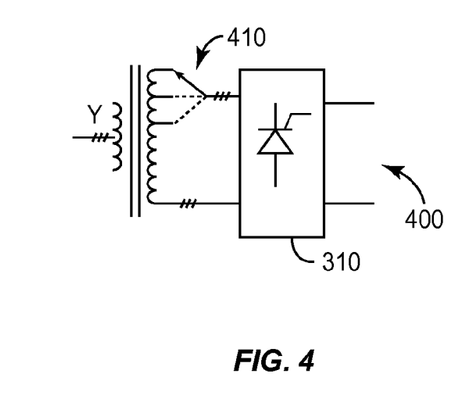

Another approach utilizes a bridge rectifier circuit 310 in combination with a transformer having a load tap changer 410, as illustrated in FIG. 4. (While FIG. 4 shows a thyristor bridge rectifier circuit 310, a diode bridge rectifier circuit may be used instead, in some applications.) The load tap changer 410 allows the transformer to output a relatively constant AC voltage to the rectifier circuit. However, in wind or marine applications, the tap changer 410 has to cover an output voltage range of 30% or more. Manufacturing a transformer with such a wide range of taps is challenging.

Figure 5:
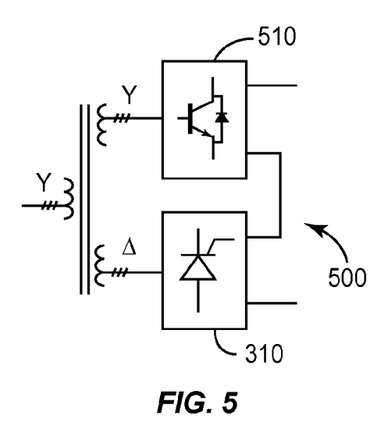

FIG. 5 illustrates an approach that is similar to that of FIG. 3, but with an IGBT-based bridge rectifier circuit 510 substituted for one of the thyristor bridge rectifier circuits 310. In a variant of this approach, integrated gate-commutated thyristor (IGCT)-based circuits or IGBT-based circuits can be substituted for either or both thyristor circuits 310. Again, while these IGBT-based or IGCT-based circuits may have a 6-pulse configuration like that illustrated in FIG. 4, they may also have other configurations. While IGBT- and IGCT-based systems offer high performance, these circuits are more costly than their thyristor-based counterparts.

Figure 6A:
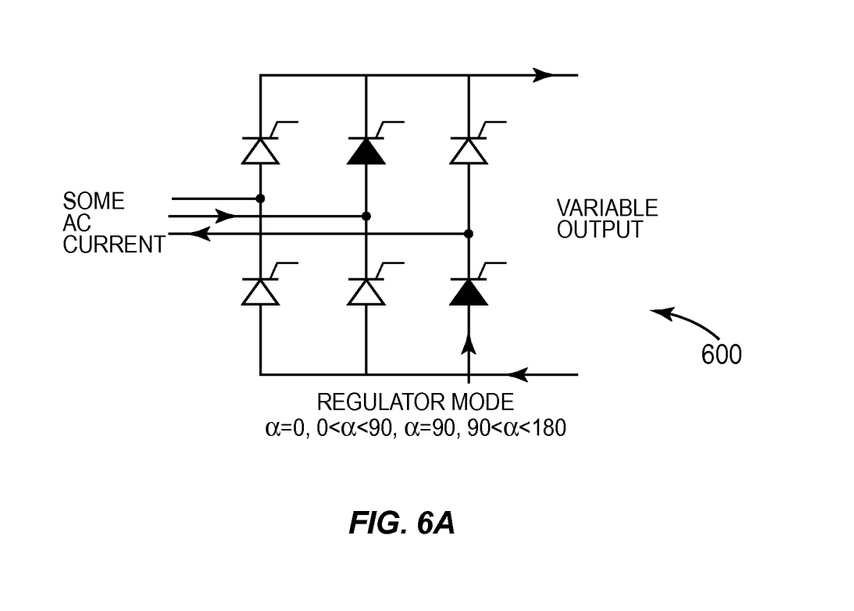
FIG. 6A illustrates the regulator mode of operation for a thyristor bridge rectifier circuit.

Lower-cost, but still high-performance alternatives according to several embodiments of the present invention are based on a thyristor bridge rectifier circuit that has a bypass mode of operation, in addition to its normal, or "regulator," mode of operation. The regulator mode of operation for a 6-pulse, three-phase, thyristor-based bridge rectifier circuit 600 is shown in FIG. 6A. In regulator mode, a pair of diodes is conducting at any given time, but the diodes in the conducting pair are in different legs. In FIG. 6A, the conducting diodes are shown in black.

As is well known, the regulating operation of the rectifier circuit of FIG. 6A can be controlled by adjusting the firing angle α. For a firing angle of zero degrees, the output of the circuit 600 is its maximum output voltage, i.e., the same output voltage that would be obtained if diodes were used instead of the thyristors. For purposes of the present discussion, this condition, where the maximum possible output voltage of the circuit is provided, is referred to as "full-output" mode. For firing angles α between zero and 90 degrees, the rectifier circuit regulates the output voltage, producing a positive output DC voltage that varies from the maximum rectifier voltage to just above zero volts DC. At a firing angle of 90 degrees, the output voltage is at or near zero volts DC, while firing angles α between 90 and 180 degrees produce a negative output voltage from the bridge. Note that the rectifier circuit can be operated in a "protection mode," in which the output voltage is reduced to zero by switching half of the thyristor bridges in a protection mode (with a firing angle between 90 and 180 degrees) and the other half in regular mode (with a firing angle between 0 and 90 degrees). For purposes of the present disclosure, a bridge rectifier circuit operated with firing angles between zero and 90 degrees, such that a non-zero voltage less than the maximum possible output voltage is provided, is considered to be operating in "voltage regulating mode." Note that the same analysis applies to 12-pulse bridge rectifier circuits, while a similar analysis can be applied to bridge rectifiers having more or fewer phases.

Figure 6B:
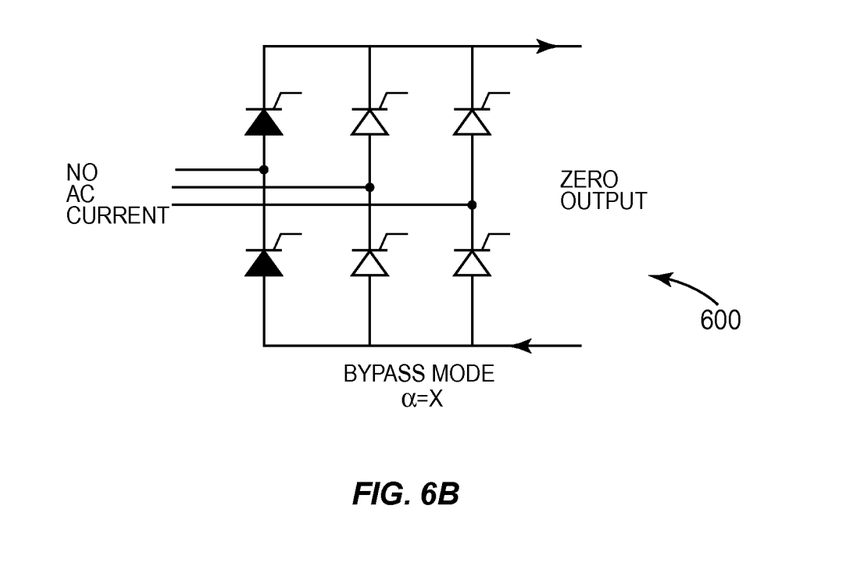
FIG. 6B illustrates the bypass mode of operation for a thyristor bridge rectifier circuit.

In the circuit of FIG. 6A, the thyristors are controlled (via their gate control inputs) so that only one thyristor in any given phase leg is conducting at the same time. This is true regardless of the firing angle α. In embodiments of the present invention, however, the controllable bridge rectifier circuit has a "bypass mode," in which both diodes in one of the phase legs are conducting at the same time. This is shown in FIG. 6B, where controllable bridge rectifier circuit 600 is operating in bypass mode, where the thyristors in both arms of the left-most phase leg are controlled so that they are conducting simultaneously. In bypass mode, the output of the rectifier circuit 600 is nominally zero volts DC, without regard to any firing angle α. Of course, there will be a small voltage drop across the thyristors even when they are fully conducting. However, the resulting output voltage of the rectifier circuit 600 in bypass mode is negligible, compared to the rectifier's maximum output voltage in full-output mode. Moreover, no AC current (or only a negligible amount of current) is drawn from the AC supply terminals. Again, while FIG. 6B illustrates a three-phase, six-pulse rectifier bridge, a similar bypass mode can be implemented with other configurations and with differing numbers of phases.

Key characteristics of the bypass mode supported by the controllable bridge rectifier circuits described above include that the output the of rectifier circuit, i.e., the voltage provided at the DC-side terminals of the circuit, is negligible (nominally zero volts), and that the circuit draws no more than a negligible amount of AC current from the AC-side terminals of the circuit. These characteristics can be exploited to great benefit by combining at least one of these controllable bridge rectifier circuits with one or more other bridge rectifier circuits, some or all of which may also be controllable. Several possible configurations are shown in FIGS. 7, 8, 9A, and 9B.

Figure 7:
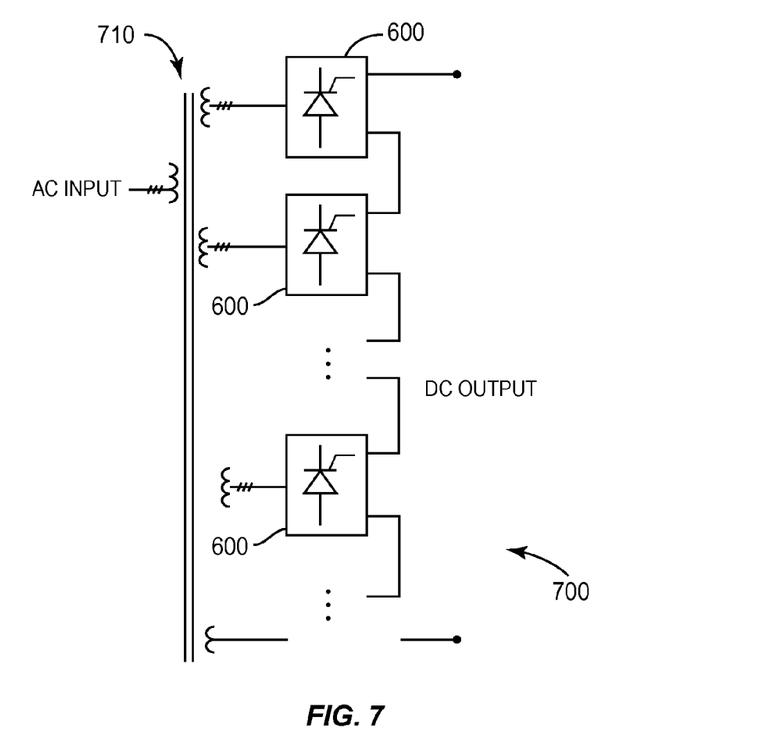
FIG. 7 is a power conversion apparatus utilizing multiple controllable bridge rectifier circuits having a bypass mode of operation.

FIG. 7 illustrates a power conversion apparatus 700 that includes a transformer 710 having a single primary winding, connected to an AC input, and several secondary windings. Each of the secondary windings is connected to a controllable bridge rectifier circuit 600 supporting both a regulator mode and a bypass mode as described above, i.e., a regulator mode in which a non-zero voltage less than or equal to the maximum rectifier voltage is supplied, and a bypass mode in which the controllable bridge rectifier circuit provides negligible voltage to its DC-side terminals and draws negligible current from its AC-side terminals. The DC-side terminals of the controllable bridge rectifier circuits 600 are connected in cascade, i.e., so that the DC outputs of the bridge rectifier circuits 600 are connected in series.

As is well known, the AC voltage supplied to any one of the secondary windings is a function of the AC voltage supplied to the primary winding and the turns-ratio between the secondary winding and the primary winding. By selecting the number of secondary windings (with corresponding controllable bridge rectifier circuits) and the turns-ratio for each, a wide variety of systems can be designed, each potentially having different maximum output voltages and power-handling capabilities.

In the configuration shown in FIG. 7, each of the controllable bridge rectifier circuits 600 can be independently controlled. This makes it possible to run two or more of these controllable bridge rectifier circuits 600 in regulator mode simultaneously. However, each rectifier circuit that is in voltage regulating mode (i.e., providing less than its maximum possible output voltage), rather than in full-output mode, is operating at a less than ideal power factor, which wastes power. Operating two or more of the bridge rectifier circuits in voltage regulating mode exacerbates this waste.

Wasted power can be minimized by operating the bridge rectifier circuits 600 of circuit 700 so that only one (at most) of the bridge rectifier circuits 600 is operating in voltage regulating mode, while each of the other bridge rectifier circuits 600 is operating in either bypass mode, thus contributing negligible voltage to the overall DC output of circuit 700, or in full-output mode, thus contributing its maximum possible DC output voltage to the overall DC output. It should be appreciated that selectively operating the bridge rectifier circuits 600 in this manner maximizes the overall power-factor for any given output voltage, while still allowing for maximum flexibility in regulating the output voltage. This operation also reduces copper losses in the transformer, since no current at all flows in the windings attached to bypassed rectifier circuits.

While FIG. 7 illustrates a circuit 700 in which all of the bridge rectifier circuits 600 are controllable rectifier circuits, other configurations in which one or more of the bridge rectifier circuits is a diode rectifier circuit are possible. This allows for a less expensive circuit, at the expense of reducing the output range. This may be quite acceptable for many applications, however. For instance, in an application where a variable AC input voltage is being converted to a fixed DC voltage and the variable AC input voltage has a range of between 70% and 100% of the nominal input voltage, one or more diode bridge rectifier circuits may be substituted for controllable bridge rectifier circuits in the circuit 700 of FIG. 7. As long as one or more controllable bridge rectifier circuits are also used, with those controllable bridge rectifier circuits having a total voltage regulating range that exceeds 30% of the fixed DC voltage output of the circuit 700, then the fixed DC voltage can be maintained while the AC input voltage varies.

Figure 8:
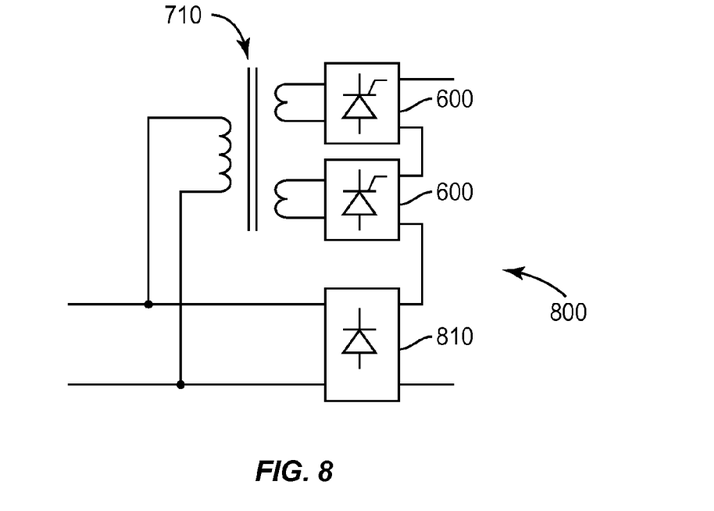
FIG. 8 is another power conversion apparatus utilizing multiple controllable bridge rectifier circuits having a bypass mode of operation.

FIG. 8 illustrates another transformer-based power conversion apparatus 800, which again includes a transformer 710 having a primary winding connected to an AC input source and multiple secondary windings (two, in this case), where each secondary winding is connected to the AC-side terminals of a controllable bridge rectifier circuit 600. Once again, the output (DC-side) terminals of the controllable bridge rectifier circuits 600 are connected in cascade, so that the DC outputs from the controllable bridge rectifier circuits 600 are summed together. Unlike the configuration shown in FIG. 7, however, the circuit 800 of FIG. 8 includes a diode bridge rectifier circuit 810 having its AC-side terminals connected to the AC input source, i.e., to the primary winding of the transformer 710. This configuration allows the transformer size to be reduced, as part of the DC output power does not pass through the transformer at all. It should be noted that while FIG. 8 shows a diode bridge rectifier circuit 810 connected to the primary side winding, a controllable bridge rectifier circuit 600 could be used instead, if a greater range of voltage regulating capability is needed.

Figure 9A:
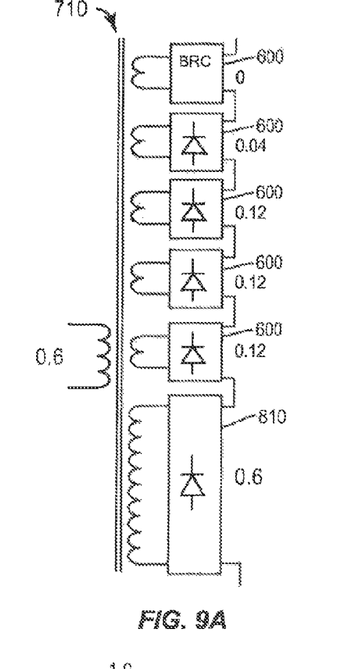
FIGS. 9A and 9B illustrate voltage control in a power conversion apparatus utilizing multiple controllable bridge rectifier circuits having a bypass mode of operation.
Figure 9B:
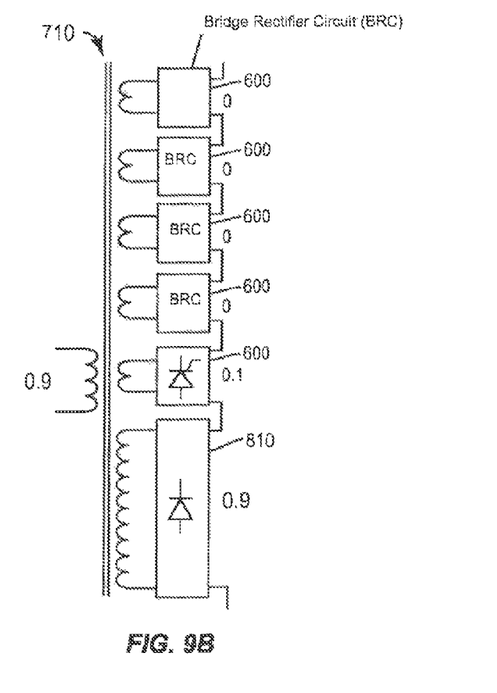

FIGS. 9A and 9B illustrate how the techniques and circuits described above can be used to produce a fixed DC output voltage from a varying AC input voltage. (It should be appreciated that the same techniques and circuits can also be used to produce a variable DC output from a fixed AC input voltage, or from a varying AC input voltage.) In the configuration shown in both FIGS. 9A and 9B, five controllable bridge rectifier circuits 600 are connected to secondary windings of transformer 710. In addition, a diode bridge rectifier circuit 810 is connected to yet another secondary winding. The DC terminals from all of these rectifier circuits are connected together, so that the DC outputs are combined in series.

The secondary windings of transformer 710 have varying turns-ratios, in the illustrated example. The secondary winding connected to diode bridge rectifier 810 has a turns ratio of 1:1. The secondary windings connected to the five controllable bridge rectifier circuits 610 each have turns ratios of 5:1.

In FIG. 9A, the input AC voltage is 0.6 times a nominal AC voltage level. The diode rectifier bridge circuit 810 produces a DC output voltage of 0.6 times a nominal DC voltage level. The three controllable bridge rectifier circuits 600 immediately above the diode bridge rectifier circuit 810 are operating in full-output mode (i.e., with a firing angle of zero degrees), and thus each produce a DC output voltage of 0.12 times the nominal DC voltage level. (Note that these three controllable bridge rectifier circuits 600 are depicted with a diode symbol, indicating that they are operating in full-output mode.) The controllable bridge rectifier circuit 600 immediately above these three is operating in voltage regulating mode (as indicated by the thyristor symbol), and is controlled to produce a DC output voltage of 0.04 times the nominal DC voltage level. Finally, the controllable bridge rectifier circuit 600 at the top of the Figure is operating in bypass mode (indicated by the absence of either a diode or thyristor symbol), and is thus producing a DC output voltage of zero, while drawing no current from the corresponding secondary winding.

The total voltage produced by the cascade combination of the bridge rectifier circuits is 1.0 times the nominal DC voltage. The bridge rectifier circuits operating either in full-output mode (including the diode rectifier bridge) or in bypass mode do not inject significant reactive power back to the primary side of the transformer. Bridge rectifier circuits operating in voltage regulating mode do inject reactive power back to the primary side. However, because only one of the controllable bridge rectifier circuits 610 is operating in voltage regulating mode, and because that particular rectifier circuit is handling only 4% of the overall output power, the overall power factor of the circuit is quite high.

The same DC output voltage can be maintained over a wide range of input voltages. In FIG. 9B, the same circuit is provided with an AC input voltage of 0.9 times the nominal AC voltage level. The diode bridge rectifier circuit 810 thus produces a DC output voltage of 0.9 times the nominal DC output level. The controllable bridge rectifier circuit 600 immediately above the diode bridge rectifier circuit 810 is operating in voltage regulating mode, and is controlled to produce a DC output voltage of 0.1 times the nominal DC output level. The remaining controllable bridge rectifier circuits 600 are all operating in bypass mode, and are thus contributing negligible DC voltage to the overall output voltage, while drawing no current from their respective secondary windings. Once again, the overall DC output voltage is 1.0 times the nominal DC voltage level. Once again, the overall power factor is relatively high, since only one controllable bridge rectifier circuit, handling only one-tenth the overall power, is operating in voltage regulating mode.

Figure 10:
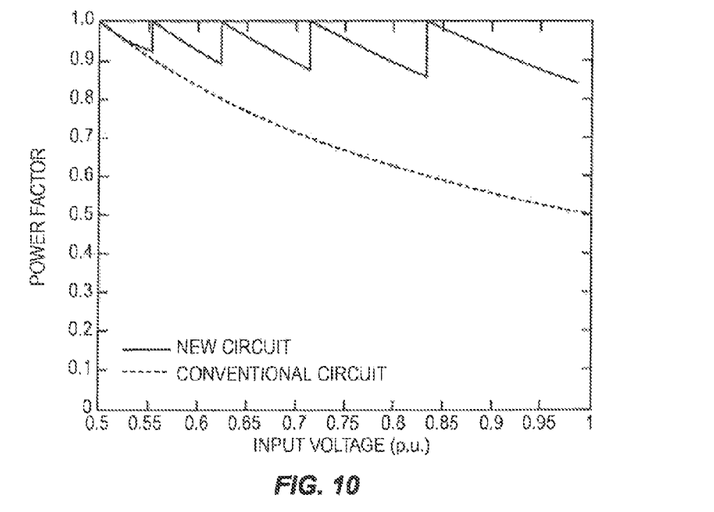
FIG. 10 plots power factor versus a varying input voltage for a conventional power conversion circuit and for a power conversion apparatus utilizing multiple controllable bridge rectifier circuits having a bypass mode of operation.

FIG. 10 illustrates the improvement in power factor that can be realized using a circuit like the one illustrated in FIG. 9, compared to a conventional circuit in which controllable bridge rectifier circuits having bypass modes of operation are not used. As suggested by FIG. 10, the minimum power factor over a wide range of regulation can set to any desired level, simply by selecting an appropriate number of cascaded controllable bridge rectifier circuits having the bypass mode described above.

As shown above, multiple bridge rectifier circuits, including one or more controllable bridge rectifier circuits having a bypass mode, can be combined and operated so as to provide a low-cost, high-performance voltage converter apparatus. One or several of the controllable bridge rectifier circuits can be selectively operated in bypass mode, allowing for coarse steps in voltage output, while a remaining controllable bridge rectifier is operated in voltage regulating mode, so as to provide a highly controllable output voltage. At the same time, a high input power factor over a wide range of voltage variation can be achieved.

It will be appreciated that numerous variations of the detailed circuits described above are possible. For instance, while the circuits detailed above are transformer-based circuits, controllable bridge rectifier circuits having a bypass mode as described herein may be used in systems that do not include a transformer, in some cases. More generally, multiple bridge rectifier circuits can be combined in cascade, in the manner described above, and connected to AC sources that are galvanically isolated from one another, i.e., having no direct conduction path between them. A transformer is simply one way to achieve such isolation. One or more bridge rectifier circuits can be connected to windings of a rotating machine, as well. Further, while thyristor-based controllable bridge rectifier circuits were described in detail above, controllable bridge rectifier circuits based at least in part on controllable switching elements other than thyristors, such as integrated gate-controlled thyristors (IGCTs) and/or gate turn-off (GTO) thyristors, may also be combined according to the techniques described herein.

Figure 12:
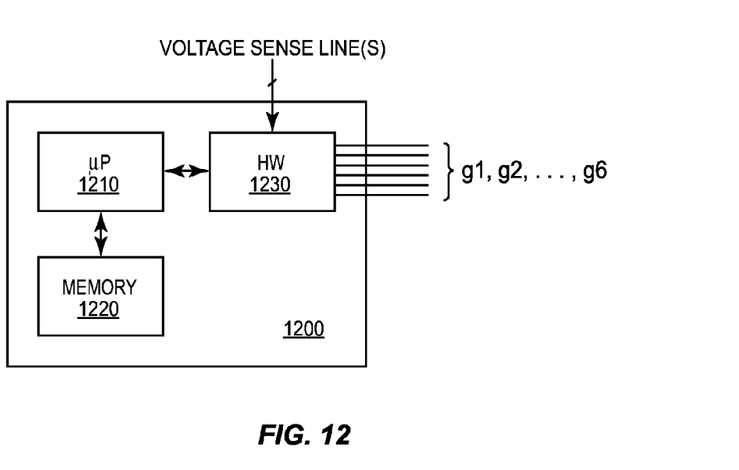
FIG. 12 illustrates an example control circuit according to some embodiments of the present invention.

Generally speaking, then, embodiments of the presently described circuit include power conversion apparatus for controllably converting alternating current (AC) to direct current (DC), where an example power conversion apparatus includes multiple AC sources galvanically isolated from one another, and multiple bridge rectifier circuits, including one or more controllable bridge rectifier circuits, where each bridge rectifier has respective AC-side terminals and DC-side terminals and each bridge rectifier circuit is connected to a corresponding one of the AC sources via its AC-side terminals. The DC-side terminals are connected so that the outputs of the bridge rectifier circuits are combined in series. Finally, the power conversion apparatus includes a control circuit configured to individually control each controllable bridge rectifier circuit to selectively operate in a regulator mode, whereby a non-zero voltage less than or equal to the maximum rectifier voltage is provided by the controllable bridge rectifier circuit, and a bypass mode, whereby the controllable bridge rectifier circuit provides negligible voltage to its DC-side terminals and draws negligible current from its corresponding AC source. An example configuration for such a control circuit is illustrated in FIG. 12 and described in detail below; it will be appreciated that conventional control circuits for operating controllable bridge rectifier circuits can be readily modified to control the one or more bridge rectifier circuits to selectively operate in bypass mode, as needed.

In some cases, the power conversion apparatus described in general terms above may include a transformer having a primary winding configured for connection to an AC source and at least one output winding. In these embodiments, at least one of the bridge rectifier circuits has its AC-side terminals connected across one of the output windings. In some of these embodiments, one of the bridge rectifier circuits has its AC-side terminals connected to the primary winding; one non-limiting example of such a configuration is shown in FIG. 8 and was described in detail above.

In some embodiments of the power conversion apparatus described in general terms above, at least one of the bridge rectifier circuits is a diode rectifier circuit. In some of these and in some other embodiments, the multiple bridge rectifier circuits include at least two controllable bridge rectifier circuits, where the regulator mode for each of the at least two controllable bridge rectifier comprises a voltage regulating mode and a full output mode, and where the control circuit is configured to control the at least two controllable bridge rectifier circuits so that only one of the controllable bridge rectifier circuits is operating in voltage regulating mode at any given time, while each of the remaining controllable bridge rectifier circuits is operating in either bypass mode or full output mode. Non-limiting examples of these embodiments were shown in FIGS. 7, 8, 9A, and 9B, above. In some of these embodiments, the control circuit is configured to control the at least two controllable bridge rectifier circuits so as to successively operate a different one of the at least two controllable bridge rectifier circuits in voltage regulating mode, while each of the remaining controllable bridge rectifier circuits is operating in either bypass mode or full output mode.

In any of the embodiments described above, one or more of the controllable bridge rectifier circuits may be a thyristor bridge rectifier, where the control circuit is configured to control the thyristor bridge rectifier to operate in bypass mode by triggering thyristors in both arms of a single phase leg to conduct simultaneously. It should be appreciated that bypass mode can use any of the phase legs. In some embodiments, it may be beneficial to rotate the bypass mode from one phase leg to another, so as to balance the thermal load (caused by the DC current flowing through the bypass leg) among the phase legs. Thus, the control circuit in these embodiments is configured to control the thyristor bridge rectifier(s) in bypass mode by successively triggering thyristors so as to rotate a bypass leg among multiple phase legs of the thyristor bridge rectifier.

Figure 11:
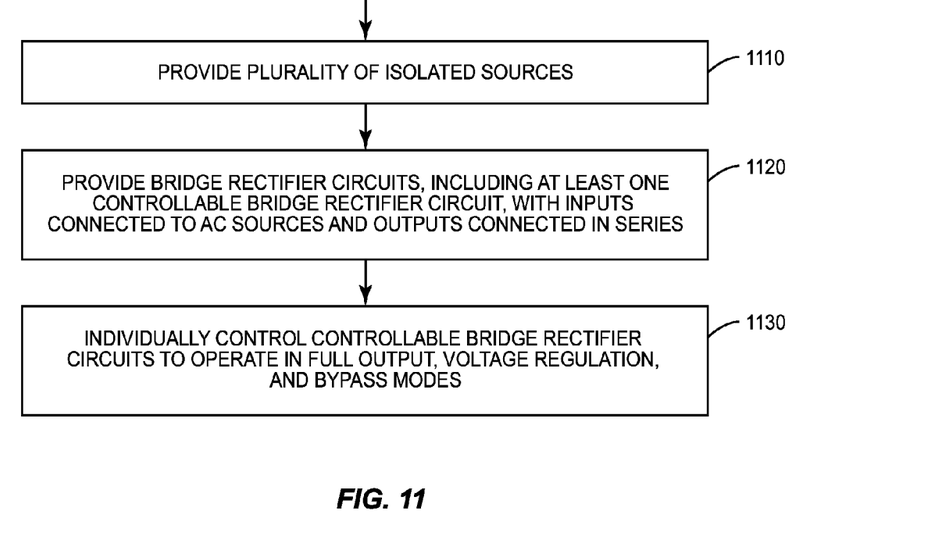
FIG. 11 is a process flow diagram illustrating an example method for controllably converting AC to DC.

Embodiments of the present invention extend not only to power-conversion apparatus, but also to methods for operating such apparatus. FIG. 11 is a process flow diagram illustrating an example of such embodiments, i.e., a method for controllably converting alternating current (AC) to direct current (DC). As shown at block 1110, the illustrated method includes providing a plurality of AC sources, galvanically isolated from one another. As shown at block 1120, a plurality of bridge rectifier circuits is also provided, including one or more controllable bridge rectifier circuits. Each bridge rectifier has respective AC-side terminals and DC-side terminals, and each bridge rectifier circuit is connected to a corresponding one of the AC source. The DC-side terminals of the bridge rectifier circuits are connected so that the outputs of the bridge rectifier circuits are combined in series. As shown at block 1130, the method further includes individually controlling each controllable bridge rectifier circuit to selectively operate in a regulator mode, whereby a non-zero voltage less than or equal to the maximum rectifier voltage is provided by the controllable bridge rectifier circuit, and a bypass mode, whereby the controllable bridge rectifier circuit provides zero voltage to its DC-side terminals and draws negligible current from its corresponding AC source.

In some embodiments of the illustrated method, a first one of the bridge rectifier circuits is a diode rectifier circuit. In some of these and in some other embodiments, the plurality of bridge rectifier circuits includes at least two controllable bridge rectifier circuits, wherein the regulator mode for each of the at least two controllable bridge rectifier comprises a voltage regulating mode and a full output mode, and the at least two controllable bridge rectifier circuits are controlled so that only one of the controllable bridge rectifier circuits is operating in voltage regulating mode at any given time, while each of the remaining controllable bridge rectifier circuits is operating in either bypass mode or full output mode. In some of these latter embodiments, the at least two controllable bridge rectifier circuits are controlled so as to successively operate a different one of the at least two controllable bridge rectifier circuits in voltage regulating mode, while each of the remaining controllable bridge rectifier circuits is operating in either bypass mode or full output mode.

In any of these embodiments, a first controllable bridge rectifier circuit is a thyristor bridge rectifier, which is controlled to operate in bypass mode by triggering thyristors in both arms of a single phase leg to conduct simultaneously. In some of these embodiments, the thyristor bridge rectifier is controlled to operate in bypass mode by successively triggering thyristors so as to rotate a bypass leg among multiple phase legs of the thyristor bridge rectifier.

As noted above, various embodiments of the present invention include a control circuit configured to individually control each controllable bridge rectifier circuit to selectively operate in a regulator mode, whereby a non-zero voltage less than or equal to the maximum rectifier voltage is provided by the controllable bridge rectifier circuit, and a bypass mode, whereby the controllable bridge rectifier circuit provides negligible voltage to its DC-side terminals and draws negligible current from its corresponding AC source. FIG. 12 illustrates one possible configuration for such a control circuit.

Control circuit 1200, shown in FIG. 12, includes a microprocessor 1210, memory 1220, and digital/analog hardware circuit 1230. In the illustrated control circuit 1200, hardware circuit 1230 outputs a set of gate control voltages g1, g2, . . . , g6, which are sufficient to control a single, 6-pulse, bridge rectifier circuit. Of course, control circuit 1200 may be readily extended to provide control voltages for multiple 6-pulse bridge rectifiers and/or to control one or more controllable bridge rectifier circuits.

In the illustrated control circuit 1200, feedback from the DC output of the power-converter circuit is provided, via a "VOLTAGE SENSE LINE," to allow for fine-tuning of the DC output from the controllable bridge rectifier circuit. In some embodiments, a voltage sense line from the AC input of the power-converter circuit may also be provide—this may be used in some embodiments to assist the microprocessor in selecting which (if any) of several controllable bridge rectifier circuits to operate in full-power mode, which (if any) to operate in bypass mode, and which to operate in voltage regulating mode. Hardware 1230 thus includes one or more analog-to-digital (A/D) converters, in some embodiments, to convert the analog signals on the one or more voltage sense lines to digital signals suitable for use by microprocessor 1210. Of course, variants of the circuit illustrated in FIG. 12 may employ a microcontroller device that incorporates not only a processor element but one or more A/D converters, in which case A/D converters need not be provided in separate hardware.

Microprocessor 1210 is configured, using program instructions stored in memory 1220, to control at least one controllable bridge rectifier circuit according to the techniques detailed above, i.e., to selectively operate in a regulator mode, whereby a non-zero voltage less than or equal to the maximum rectifier voltage is provided by the controllable bridge rectifier circuit, and a bypass mode, whereby the controllable bridge rectifier circuit provides negligible voltage to its DC-side terminals and draws negligible current from its corresponding AC source. Memory circuit 1220 may comprise one or several memory devices and/or memory types, such as flash memory or other non-volatile memory, random-access memory (RAM), read-only memory (ROM), etc.

It will be appreciated that the control circuit shown in FIG. 12 is but one example of a circuit that can be adapted to control one or more controllable bridge rectifier circuits according to the techniques described herein. Control circuits developed to control conventional controllable bridge rectifier circuits can be readily adapted to further support a bypass mode, for example, and adapted to include logic for determining which of multiple controllable rectifiers should be operated in bypass mode, full-output mode, or voltage regulating mode. Other information and/or signals supplied to the control circuit may also be used to make or refine these decisions. For instance, information or signaling indicating a DC fault downstream from the DC output of one of the power conversion devices described above may trigger the control circuit to reduce the output voltage, e.g., by placing some or all of the controllable bridge rectifiers in bypass mode, and/or operating one or more of the controllable bridge rectifiers in a protection mode. Other variants and modifications of the techniques detailed herein will be apparent to those skilled in the art of power converter and HVDC system design.

It should be appreciated that the techniques described above can be employed to provide several advantages, relative to conventional power-conversion circuits and apparatus. As detailed above, for example, a power-conversion circuit constructed and operated according to the techniques detailed herein can operate at a significantly higher power factor, over a wide range of voltages. The circuits described herein can be of lower cost than circuits that utilize higher-cost control devices such as IGBTs. Some of the circuits and techniques described herein can also be used to reduce the size and cost of the transformer used in a power conversion apparatus, since complicated and expensive load tap changers can be avoided. The use of multiple windings, rather than multiple taps, can also result in transformer-based systems that are easier to manufacture, and more reliable. If press-pack diodes and/or thyristors are used in the described circuits, then failed modules are easily bypassed without external bypass devices (e.g., compared to modular implementations of rectifiers that use industrial IGBTs, as illustrated in FIG. 2), since press-pack diodes and thyristors fail short.

Of course, it should be understood that the present invention is not limited by the foregoing description, nor is it limited by the accompanying drawings. Instead, the present invention is limited only by the following claims and their legal equivalents. With the above-described circuits, systems, methods, and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. A power conversion apparatus for controllably converting alternating current (AC) to direct current (DC), the power conversion apparatus comprising:

a plurality of AC sources galvanically isolated from one another;

a plurality of bridge rectifier circuits, including one or more controllable bridge rectifier circuits, wherein each of the plurality of bridge rectifier circuits has respective AC-side terminals and DC-side terminals and each of the plurality of bridge rectifier circuits is connected to a corresponding one of the plurality of AC sources via each bridge rectifier circuit at respective AC-side terminals, and wherein the DC-side terminals are connected so that outputs of the plurality of bridge rectifier circuits are combined in series; and a control circuit configured to individually control each of the one or more controllable bridge rectifier circuits to selectively operate in (i) a regulator mode, whereby a non-zero voltage less than or equal to a maximum rectifier voltage is provided by the DC-side terminals of each of the one or more controllable bridge rectifier circuits, and (ii) a bypass mode, whereby each of the one or more controllable bridge rectifier circuits provides a nominally zero voltage to the DC-side terminals of the one or more controllable bridge rectifier circuits and draws a nominally zero current from the corresponding one of the plurality of AC sources connected to the controllable bridge rectifier circuits, even while one or more of the plurality of bridge rectifier circuits are operating in regulator mode;

wherein the plurality of bridge rectifier circuits includes at least two controllable bridge rectifier circuits, wherein the regulator mode for each of the at least two controllable bridge rectifier circuits comprises a voltage regulating mode and a full output mode, and wherein the control circuit is configured to control the at least two controllable bridge rectifier circuits so that only one of the controllable bridge rectifier circuits is operating in voltage regulating mode at any given time, while each of the remaining controllable bridge rectifier circuits is operating in either bypass mode or full output mode.

2. The power conversion apparatus of claim 1, further comprising a transformer having a primary winding configured for connection to one or more of the plurality of AC sources and at least one output winding, wherein at least one of the plurality of bridge rectifier circuits has each bridge rectifier circuit at respective AC-side terminals connected across the at least one output winding.

3. The power conversion apparatus of claim 2, wherein the respective AC-side terminals of one of the plurality of bridge rectifier circuits is conductively connected to the primary winding.

4. The power conversion apparatus of claim 1, wherein one or more of the plurality of AC sources is a winding of a rotating machine.

5. The power conversion apparatus of claim 1, wherein at least one of the plurality of bridge rectifier circuits is a diode rectifier circuit.

6. The power conversion apparatus of claim 1, wherein the control circuit is configured to control the at least two controllable bridge rectifier circuits so as to successively operate a different one of the at least two controllable bridge rectifier circuits in voltage regulating mode, while each of the remaining controllable bridge rectifier circuits is operating in either bypass mode or full output mode.

7. The power conversion apparatus of claim 1, wherein one of the one or more controllable bridge rectifier circuits is a thyristor bridge rectifier, and wherein the control circuit is configured to control the thyristor bridge rectifier to operate in bypass mode by triggering a thyristor in each one of two arms of a single phase leg to conduct simultaneously.

8. The power conversion apparatus of claim 7, wherein the control circuit is configured to control the thyristor bridge rectifier in bypass mode by successively triggering thyristors so as to rotate a bypass leg among multiple phase legs of the thyristor bridge rectifier.

9. A method for controllably converting alternating current (AC) to direct current (DC), the method comprising:
providing a plurality of AC sources, galvanically isolated from one another;
providing a plurality of bridge rectifier circuits, including one or more controllable bridge rectifier circuits, wherein each of the plurality of bridge rectifier circuits has respective AC-side terminals and DC-side terminals and each of the plurality of bridge rectifier circuits is connected to a corresponding one of the plurality of AC sources, and wherein the DC-side terminals are connected so that outputs of the plurality of bridge rectifier circuits are combined in series; and
individually controlling each of the one or more controllable bridge rectifier circuits to selectively operate in a regulator mode, whereby a non-zero voltage less than or equal to a maximum rectifier voltage is provided by each of the one or more controllable bridge rectifier circuits, and a bypass mode, whereby each of the one or more controllable bridge rectifier circuits provides a nominally zero voltage to the DC-side terminals of the one or more controllable bridge rectifier circuits and draws a nominally zero current from the corresponding one of the plurality of AC sources connected to the controllable bridge rectifier circuit;

wherein the plurality of bridge rectifier circuits includes at least two controllable bridge rectifier circuits, wherein the regulator mode for each of the at least two controllable bridge rectifier circuits comprises a voltage regulating mode and a full output mode, and wherein the method further comprises controlling the at least two controllable bridge rectifier circuits so that only one of the controllable bridge rectifier circuits is operating in voltage regulating mode at any given time, while each of the remaining controllable bridge rectifier circuits is operating in either bypass mode or full output mode.

10. The method of claim 9, wherein at least one of the bridge rectifier circuits is a diode rectifier circuit.

11. The method of claim 9, wherein the method comprises controlling the at least two controllable bridge rectifier circuits so as to successively operate a different one of the at least two controllable bridge rectifier circuits in voltage regulating mode, while each of the remaining controllable bridge rectifier circuits is operating in either bypass mode or full output mode.

12. The method of claim 9, wherein one of the one or more controllable bridge rectifier circuits is a thyristor bridge rectifier, and wherein the method comprises controlling the thyristor bridge rectifier to operate in bypass mode by triggering a thyristor in each one of two arms of a single phase leg to conduct simultaneously.

13. The method of claim 12, wherein the method comprises controlling the thyristor bridge rectifier in bypass mode by successively triggering thyristors so as to rotate a bypass leg among multiple phase legs of the thyristor bridge rectifier.

\* \* \* \* \*